US 7,503,213 B2

(12) United States Patent
Campbell

(10) Patent No.: US 7,503,213 B2
(45) Date of Patent: Mar. 17, 2009

(54) BIMETALLIC SENSOR MOUNT FOR AXLES

(75) Inventor: Rodney J. Campbell, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 448 days.

(21) Appl. No.: 11/380,523

(22) Filed: Apr. 27, 2006

(65) Prior Publication Data

US 2007/0251319 A1 Nov. 1, 2007

(51) Int. Cl.
*G01P 15/00* (2006.01)
(52) U.S. Cl. .......................................... 73/488; 73/494
(58) Field of Classification Search ................... 73/488, 73/494, 504.12, 504.18, 514.35, 528, 540; 301/124.1; 384/448, 544, 512, 589
See application file for complete search history.

(56) References Cited

U.S. PATENT DOCUMENTS

| 5,063,345 | A |   | 11/1991 | Akiyama |
|---|---|---|---|---|
| 5,091,022 | A | * | 2/1992 | Achikita et al. ............. 148/104 |
| 5,122,740 | A |   | 6/1992 | Cottam et al. |
| 5,486,757 | A |   | 1/1996 | Easley |
| 5,486,758 | A |   | 1/1996 | Hammerle |
| 5,640,087 | A |   | 6/1997 | Alff |
| 5,967,473 | A |   | 10/1999 | Singbartl |
| 5,997,182 | A | * | 12/1999 | Brown .......................... 384/448 |
| 6,019,086 | A |   | 2/2000 | Schneider et al. |
| 6,081,111 | A |   | 6/2000 | Herderich et al. |
| 6,127,819 | A |   | 10/2000 | Ouchi et al. |
| 6,232,772 | B1 |   | 5/2001 | Liatard et al. |
| 6,400,135 | B1 |   | 6/2002 | Skoff et al. |
| 6,539,800 | B2 |   | 4/2003 | Yamashita |
| 6,650,412 | B1 | * | 11/2003 | Slater .......................... 356/328 |
| 6,766,820 | B1 | * | 7/2004 | Hoss ............................ 137/66 |
| 6,774,623 | B2 |   | 8/2004 | Palfenier et al. |
| 6,911,817 | B2 |   | 6/2005 | Clark |
| 2005/0006075 | A1 | * | 1/2005 | Wanni et al. ................. 165/162 |
| 2005/0206222 | A1 | * | 9/2005 | Swanson .................. 301/124.1 |

* cited by examiner

*Primary Examiner*—Hezron Williams
*Assistant Examiner*—Samir M Shah
(74) *Attorney, Agent, or Firm*—Harness, Dickey & Pierce, P.L.C.

(57) ABSTRACT

An axle assembly for a vehicle includes an axle housing having a tubular portion. A bimetallic sensor mount having a first region of corrosion resistant material and a second region of weldable material is welded to the tubular portion. A differential unit including a side gear is disposed in a central cavity of the axle housing. An axleshaft having a shaft portion and a target portion with a plurality of teeth is disposed in the tubular portion of the axle housing. The shaft portion is coupled to the side gear. A sensor is coupled to the sensor mount and extends through an aperture in the mount and the tubular portion to locate an end portion of the sensor a predetermined distance from the teeth of the target portion. A method of making an axle assembly having a sintered bimetallic sensor mount is also disclosed.

32 Claims, 3 Drawing Sheets

BIMETALLIC SENSOR MOUNT FOR AXLES

BACKGROUND OF THE INVENTION

The present invention relates generally to speed sensor assemblies for use in motor vehicles and, more particularly, to a speed sensor assembly having a bimetallic sensor mount for mounting a speed sensor to a support structure.

As is well known, speed sensor assemblies are used in motor vehicle applications to detect the rotational speed of a rotary member (e.g., wheels, axleshafts, propshafts, etc.). The signal generated by the sensor is typically used to control actuation of vehicle systems such as, for example, anti-lock braking systems, four-wheel drive and all-wheel drive torque transfer systems, torque biasing or limited slip axle systems and electronic stability control systems.

Most speed sensor assemblies are equipped with a sensor that is operable to detect discontinuities, such as gear teeth, along a target surface. The target surface can be formed on the rotary member or can be formed on a target member, such as a tone wheel or exciter ring, that is mounted to the rotary member. In its environment of use, the speed sensor assembly requires a sensor mount for mounting the sensor to a stationary support structure. For example, one relatively common vehicular mounting arrangement for a speed sensor assembly utilizes a Hall-effect sensor which is mounted to the axle housing and an exciter ring that is secured to the axleshaft. The sensor mount for this arrangement typically employs a steel boss that is welded to the axle housing. Once the steel boss has been welded to the axle housing, it is machined to receive the sensor, as well as fasteners employed to both orient and secure the Hall-effect sensor to the axle housing. During prolonged vehicle operation, the steel boss on the axle housing tends to oxidize. If iron oxide forms at the mounting interface between the sensor and the boss, the position of the sensor may change relative to the exciter ring. Due to the operational characteristics of the Hall-effect sensor, a change in sensor position relative to the exciter ring can result in a loss of wheel speed sensing capability. Accordingly, a need exists for providing a speed sensor assembly having a sensor mount that is resistant to corrosion.

SUMMARY OF THE INVENTION

It is an object of the present invention to address the limitations of conventional speed sensor assemblies by providing a speed sensor assembly having a sensor mount capable of reducing corrosion between the sensor and the mounting structure.

As a related object, the speed sensor assembly of the present invention includes a bimetallic sensor mount having a first region of a first metallic material that is adapted to support the sensor and a second region of a second metallic material that is adapted for attachment to the mounting structure.

According to another related object, the bimetallic sensor mount associated with the speed sensor assembly of the present invention is a powdered metal component having its first region formed from a corrosion resistant material and its second region formed from a material capable of being welded to the mounting structure.

Pursuant to yet another object, the speed sensor assembly of the present invention is intended for use in association with power transmission assemblies of the type used in motor vehicles for detecting the rotational speed of a rotary component.

In accordance with these and other objects, the speed sensor assembly of the present invention is disclosed for use in cooperation with an axle assembly to detect the rotary speed of an axleshaft. The axle assembly includes an axle housing defining a central cavity and an axle tube attached to the axle housing within which the axleshaft is rotatably supported. A differential gearset is rotatably supported within the central cavity and includes an output side gear that is coupled to an end portion of the axleshaft. The sensor assembly includes a sensor device and a bimetallic sensor mount. The bimetallic sensor mount includes a first region of corrosion resistant material and a second region of weldable material. The sensor mount is arranged such that its second region is welded to the axle tube. The sensor extends through an aperture formed through the sensor mount and the axle tube such that its end portion is located a predetermined distance from a target surface formed on or secured to a target portion of the axleshaft.

The present invention is further directed to a method of making an axle assembly which includes the steps of providing an axle housing with a tubular portion and providing a sensor mount having a first region of non-corrosive metal and a second region of weldable metal. The method also includes the steps of welding the second region of the sensor mount to the tubular portion, forming a sensor aperture through the sensor mount and the tubular portion of the axle housing, and installing an axleshaft into the tubular portion. The axleshaft includes a target portion that is aligned with the sensor aperture. Further, the method includes the steps of inserting the sensor into the sensor aperture to position an end of the sensor a predetermined distance from the target portion and securing the sensor to the first region of the sensor mount.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is not intended to limit the invention, its application, or uses.

The present invention is directed to a speed sensor assembly adapted for use in a variety of speed sensing applications and which has a sensor operable to detect the rotational speed of a rotary member. The sensor is mounted to a sensor mount that is rigidly fixed to a mounting structure such that an end portion of the sensor is positioned in close proximity to a target on the rotary member. The term "rotary member" is intended to define any component such as, for example, a wheel or a shaft, for which a rotational speed value is required. Likewise, the term "sensor" is intended to define any passive device such as, for example, a variable reluctance sensor or any active device such as, for example, a Hall-effect device or magneto-resistive element capable of generating a rotary speed signal. Finally, the term "target" is intended to define any component or surface having discontinuities extending from a target surface and may include, for example, a tone wheel, an exciter ring or a gear ring.

Figure 1:
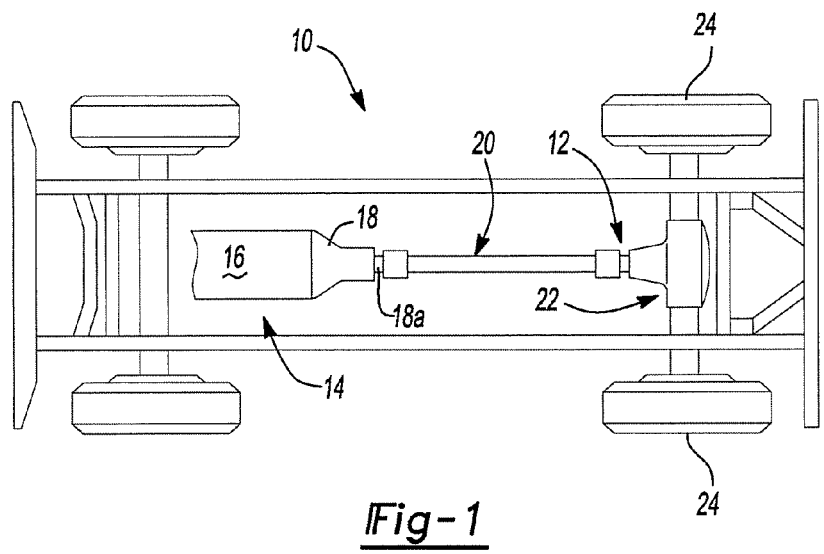
FIG. 1 is a schematic illustration of an exemplary vehicle equipped with a powertrain assembly having a speed sensor assembly constructed in accordance with the teachings of the present disclosure.

With reference to FIG. 1 of the drawings, a vehicle having an axle assembly that is constructed in accordance with the teachings of the present disclosure is generally indicated by reference numeral 10. Vehicle 10 includes a driveline 12 adapted to receive rotary power (i.e., drive torque) from a powertrain 14. Powertrain 14 includes an engine 16 and a transmission 18. Driveline 12 includes a propshaft assembly 20, a rear axle assembly 22 and a pair of rear wheels 24. Engine 16 is mounted in an in-line or longitudinal orientation along the axis of vehicle 10 and its output is selectively coupled via a conventional clutch (not shown) to the input of transmission 18 for rotation about a rotary axis. Transmission 18 also includes an output 18a and a geartrain (not shown). The geartrain is operable for coupling the transmission input to transmission output 18a at a predetermined gear speed ratio. Propshaft assembly 20 is coupled for rotation with transmission output 18a. Drive torque is transmitted through propshaft assembly 20 to rear axle assembly 22 where it is selectively apportioned to left and right rear wheels 24.

Figure 2:
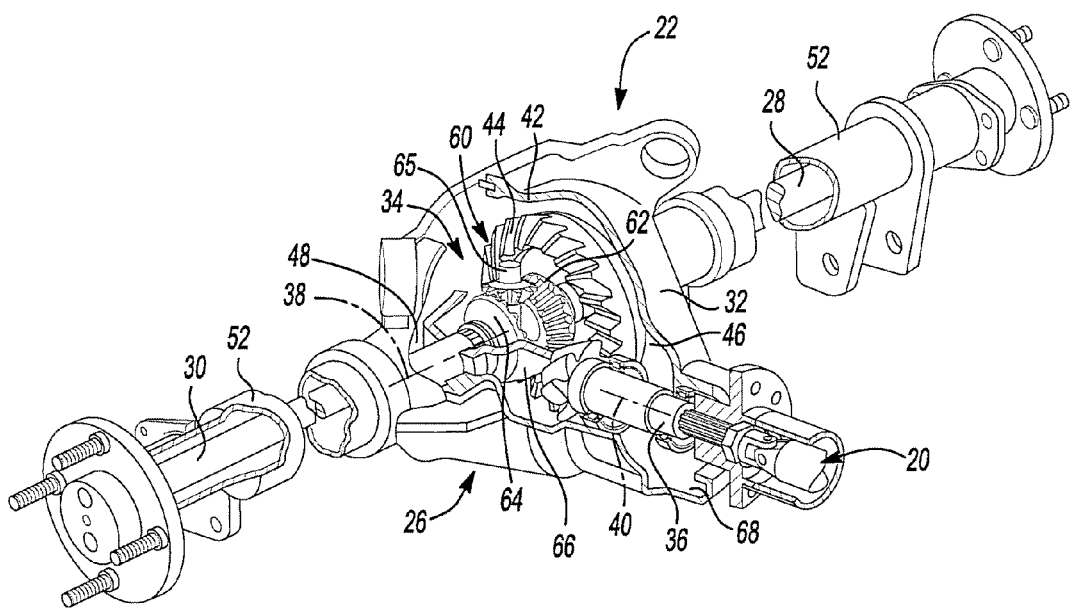
FIG. 2 is a partially cut away perspective view of the powertrain assembly of FIG. 1 illustrating the components of a rear axle assembly and a propshaft in greater detail.

With additional reference to FIG. 2, rear axle assembly 22 is shown to include a carrier assembly 26, a left axleshaft 28 and a right axleshaft 30. Carrier assembly 26 includes a housing 32, a differential unit 34 and a pinion or input shaft 36. Housing 32 supports differential unit 34 for rotation about a first axis 38 and further supports pinion shaft 36 for rotation about a second axis 40 that is perpendicular to first axis 38. Housing 32 includes a wall member 42 that defines a central cavity 44 having a left axle aperture 46 and a right axle aperture 48 aligned with first axis 38 and an input shaft aperture 68 aligned with second axis 40. Housing 32 also includes a pair of axle tubes 52 that are fixedly mounted to wall member 42 so as to be aligned with axle apertures 46 and 48.

Differential unit 34 is disposed within central cavity 44 of housing 32 and includes a gearset 60. Gearset 60 includes first and second side gears 62 and 64, respectively, and a plurality of pinions 65. Pinions 65 are rotatably supported from a differential case 66 which, in turn, is rotatably supported within central cavity 44 of housing 32. Left and right axleshafts 28 and 30 extend through left and right axle apertures 46 and 48, respectively, where they are coupled for rotation about first axis 38 with first and second side gears 62 and 64, respectively.

Pinion shaft 36 extends through input shaft aperture 68 where it is supported in housing 32 for rotation about second axis 40. Pinion shaft 36 is coupled for rotation with propshaft assembly 20 and is operable for transmitting drive torque to differential unit 34. More specifically, the drive torque received by pinion shaft 36 is transmitted to differential case 66 of differential unit 34 such that drive torque is distributed through pinions 65 to first and second side gears 62 and 64, thereby causing left and right axleshafts 28 and 30 to rotate about first axis 38.

Figure 3:
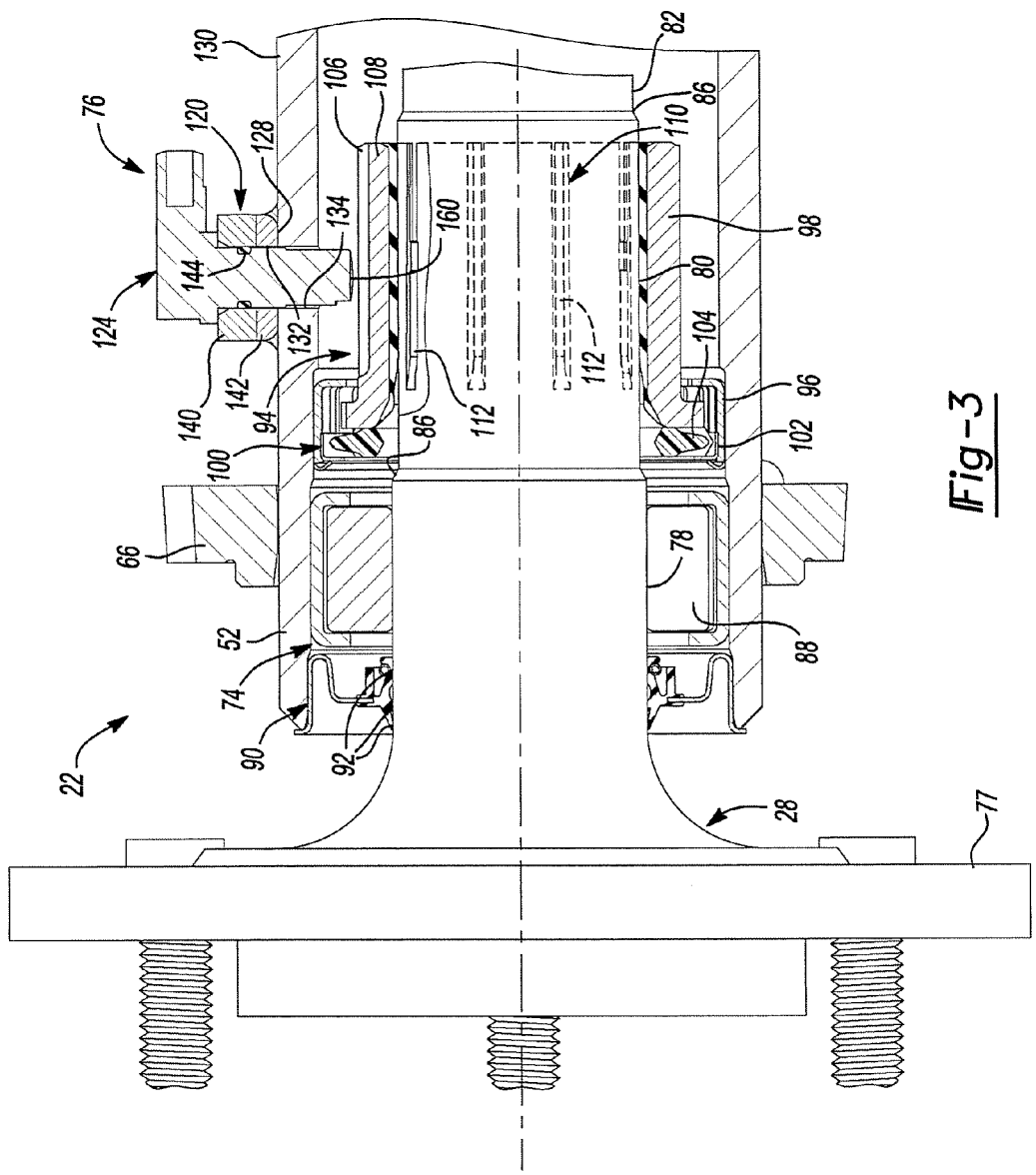
FIG. 3 is a fragmentary sectional view of a portion of the rear axle assembly illustrating the components of the speed sensor assembly constructed according to the present invention.
Figure 4:
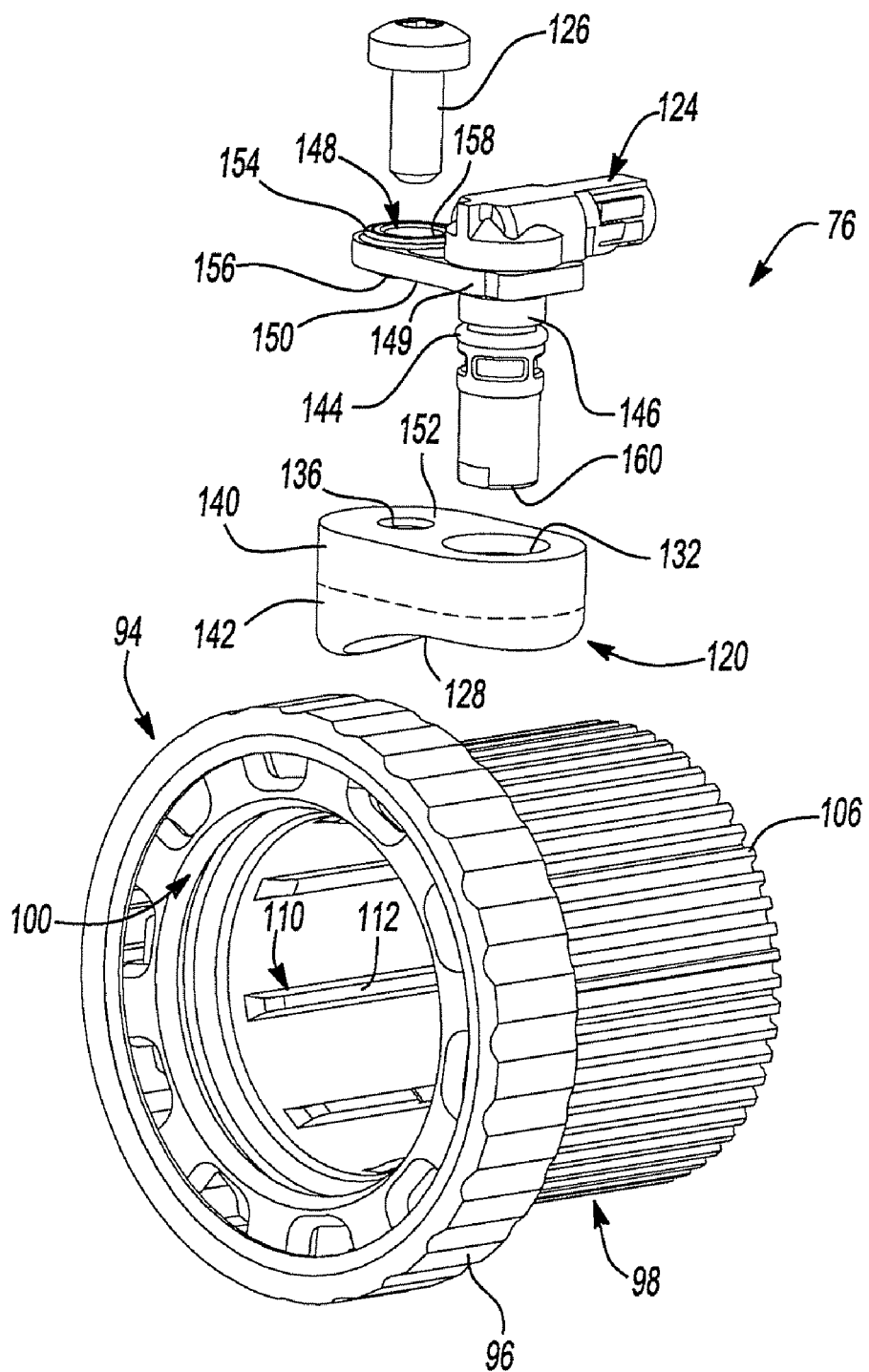
FIG. 4 is an exploded perspective view of the speed sensor assembly shown in FIG. 3.

FIGS. 3 and 4 depict left axleshaft 28 and portions of axle assembly 22 in greater detail. As one of ordinary skill in the art would appreciate from this disclosure, the left side of axle assembly 22 is substantially similar to the right side. As such, a detailed discussion of the left side of axle assembly 22 will suffice for both. A bearing assembly 74 supports left axleshaft 28 for rotation relative to axle tube 52. As will be detailed, a sensor assembly 76 constructed in accordance with the present invention is coupled to axle tube 52 utilizing a method of the present invention.

Axleshaft 28 includes a drive flange 77, a bearing support portion 78, a target mount portion 80 and a shaft portion 82, the end of which is fixed for rotation with left side gear 62. In the particular example provided, bearing support portion 78 is formed with a first diameter, shaft portion 82 is formed with a second, relatively smaller diameter and target mount portion 80 is formed with a third diameter that is intermediate the diameters of bearing support portion 78 and shaft portion 82. Appropriately sized and contoured transition sections 86 are employed between bearing support portion 78, target mount portion 80 and shaft portion 82 so as to reduce stress concentrations.

As noted, bearing assembly 74 supports axleshaft 28 for rotation in axle tube 52. In this regard, bearing assembly 74 may be pressed into axle tube 52 such that elements (e.g., rollers 88) support bearing support portion 78 of axleshaft 28. A seal 90 is coupled to axle tube 52 in a conventional manner to retain lubricating fluids in axle tube 52 as well as to inhibit the transmission of dirt, debris and other contaminants to the interior of axle tube 52. Seal 90 may include one or more seal lips 92 that sealingly engage bearing support portion 78 of axleshaft 28.

Left axleshaft 28 also includes a target or exciter ring assembly 94 having a housing 96 axially positioning a tone wheel 98. A retainer 100 includes a case 102 and a nylon member 104. Case 102 is press-fit within housing 96 to mount retainer 100 to exciter ring assembly 94. Housing 96 may be pressed into axle tube 52 to retain and properly position exciter ring assembly 94. Once exciter ring assembly 94 is mounted to axle tube 52, nylon member 104 functions to maintain the axial position of tone wheel 98.

Tone wheel 98 includes a target portion having a plurality of discontinuity features, such as radially-extending and circumferentially spaced-apart teeth 106. Teeth 106 extend radially outwardly from a body portion 108 of tone wheel 98. A plurality of gripping portions 110 extend radially inwardly from body portion 108. Gripping portions 110 are circumferentially spaced-apart from one another. Each gripping portion 110 includes a surface 112 sized and positioned to engage exciter ring mount portion 80 of axleshaft 28. At initial assembly, a minor interference fit exists between gripping portions 110 and axleshaft 28. Gripping portions 110 are constructed from a material that swells when exposed to axle lubricant. Accordingly, when exposed to axle lubricant, gripping portions 110 swell to provide an increased amount of interference. It should be appreciated that an alternate embodiment axleshaft is contemplated where a target portion having teeth 106 is formed directly on axleshaft 28. As such, exciter ring assembly 94 need not be present within an axle assembly having a sensor assembly 76 as provided in this disclosure.

Referring primarily to FIGS. 3 and 4, sensor assembly 76 is shown to include a sensor mount 120, a sensor 124 and a mounting bolt 126. Mount 120 includes an arcuately shaped bottom surface 128 that is configured to complement an outer surface 130 of axle tube 52. Mount 120 is preferably welded to axle tube 52. Mount 120 includes a first throughbore 132 that is aligned with an axle tube throughbore 134 formed in axle tube 52. First throughbore 132 and axle tube throughbore 134 may be simultaneously machined after mount 120 is welded to axle tube 52. In this manner, consistent size and alignment of the throughbores is assured. A blind threaded bore 136 extends into mount 120 and is sized to threadingly receive mounting bolt 126.

In accordance with the present invention, mount 120 is fabricated to include a first layer or region of material and a second layer or region of material. Preferably, mount 120 is constructed by sintering two different powdered metals to form a unitary, one-piece structure. Specifically, a first region 140 of mount 120 is constructed from a material that will resist corrosion during operation while a second region 142 of mount 120 is constructed from a material that is weldable to a mounting structure, such as surface 130 of axle tube 52. One example of a material for first region 140 is SS304N1 modified powdered metal per MPIF standard 35. Another example of a material for first region 140 is 304 stainless steel. However, it should be appreciated that these powdered metal specifications are merely exemplary and any number of corrosion resistant materials may be used to form first region 140.

First region 140 is constructed to be sufficiently thick such that a seal 144 associated with sensor 124 is positioned in contact with first region 140. Seal 144 functions to inhibit fluid located within axle tube 52 from escaping through first throughbore 132. Because seal 144 contacts a corrosion resistant surface of first region 140, sensor 124 may be simply removed from mount 120 after long periods of use without interference from corrosion within first throughbore 132 at locations proximate to seal 144. One exemplary material for second region 142 includes FY4500 modified sintered phosphorous iron alloy. This alloy is defined to include a maximum carbon content of 0.10%. Again, the material specification is merely exemplary and it should be appreciated that any number of weldable powdered metals may be specified as a suitable material for second region 142.

Sensor 124 includes a body 146 and a sensor insert 148 coupled to body 146. Body 146 includes a substantially planar elongated flange 149 having a bottom surface 150 adapted to be positioned substantially parallel to and spaced apart from an upper planar surface 152 of mount 120. Sensor insert 148 is shaped as a substantially cylindrical tube having a first end face 154 and an opposite second end face 156. An aperture 158 extends through sensor insert 148. Aperture 158 is adapted to receive mounting bolt 126. Once assembled, the head of bolt 126 engages first end face 154. Second end face 156 engages planar surface 152. Sensor 124, sensor insert 148 and mount 120 are sized to accurately position an end 160 of sensor 124 a predetermined distance from teeth 106 of tone wheel 98. Additionally, mounting bolt 126 and sensor insert 148 provide a convenient manner to removably secure sensor 124 to sensor mount 120 once sensor mount 120 is welded to axle tube 52.

Sensor 124 may be any passive or active probe or device capable of generating a signal. Preferably, sensor 124 is a Hall-effect device operable to determine the presence and/or absence of a tooth 106 during rotation of axleshaft 28. By accurately positioning end 160 in relation to tone wheel 98, the rotational speed of axleshaft 28 may be determined. Through the use of bimetallic mount 120, corrosion to surfaces affecting the position of end 160 will be greatly reduced. Therefore, the likelihood of obtaining accurate wheel speed data for extended periods of time should be increased. To further reduce corrosion between the components of sensor assembly 76, sensor insert 148 and mounting bolt 126 may be constructed from stainless steel materials to eliminate, or at least reduce, the tendency for galvanic corrosion to occur between the engaging surfaces of mounting bolt 126, sensor insert 148 and mount 120. As noted, it is contemplated that a similar sensor assembly and mounting arrangement would be provided on the right side of axle assembly 22 to detect the rotary speed of right axleshaft 30.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims. Likewise, those skilled in the art will readily recognize that the invention set forth in this disclosure can be used in a variety of other speed sensing applications.

What is claimed is:

1. An axle assembly for a vehicle, comprising:
   an axle housing having a tubular portion with a throughbore;
   a sensor mount having a first region of corrosion resistant material and a second region of weldable material, said second region being welded to said tubular portion of said axle housing;
   an axleshaft rotatably supported in said tubular portion of said axle housing;
   a target member coupled to said axleshaft, and having a target surface; and
   a sensor coupled to said sensor mount, said sensor extending through an aperture in said sensor mount and said throughbore of said axle housing for locating an end portion of said sensor in proximity to said target surface of said target member.

2. The axle assembly of claim 1 wherein said sensor mount is a sintered powdered metal component.

3. The axle assembly of claim 2 wherein said first region of corrosion resistant material includes stainless steel.

4. The axle assembly of claim 2 wherein said first region of corrosion resistant material includes SS304N1 modified powdered metal.

5. The axle assembly of claim 2 wherein said first region of corrosion resistant material includes 304 stainless steel.

6. The axle assembly of claim 2 wherein said second region of weldable material includes FY4500 sintered phosphorous iron alloy.

7. The axle assembly of claim 1 wherein said second region includes a material having a maximum carbon content of 0.10 percent.

8. The axle assembly of claim 1 wherein said first region of material is shaped as a layer extending from a distal upper surface of said sensor mount.

9. The axle assembly of claim 8 wherein said second region of material is shaped as a layer extending from a proximal lower surface of said sensor mount.

10. The axle assembly of claim 1 further including a seal positioned between said sensor and said sensor mount, said seal being in engagement with said first region of material.

11. The axle assembly of claim 1 wherein said second region of material of said sensor mount includes a concave surface engaging said tubular portion of said axle housing.

12. The axle assembly of claim 1 further including a cylindrical sensor insert coupled to said sensor mount via a threaded fastener, said sensor insert being operable to restrict movement of said sensor relative to said sensor mount.

13. The axle assembly of claim 12 wherein said sensor insert includes stainless steel.

14. The axle assembly of claim 1 wherein said first region of material is adjacent to and in contact with said second region of material.

15. An axle assembly for a vehicle, comprising:
- an axle housing defining a central cavity, said axle housing including a tubular portion with a hole extending therethrough;
- a bimetallic sensor mount having a first region of corrosion resistant material and a second region of weldable material, said second region being welded to said tubular portion of said axle housing;
- a differential unit disposed in said central cavity, and including an output gear;
- an axleshaft disposed in said tubular portion of said axle housing, said axleshaft having a shaft portion and a target portion, said shaft portion being coupled to said output gear, said target portion including a plurality of surface discontinuities; and
- a sensor coupled to said sensor mount and extending through an aperture in said sensor mount and said hole in said tubular portion to thereby locate a portion of said sensor in proximity to said surface discontinuities on said target portion of said axleshaft.

16. The axle assembly of claim 15 wherein said target portion is a tone wheel fixed for rotation with said axleshaft.

17. The axle assembly of claim 15 further comprising a seal coupled to said tubular portion of said axle housing and sealingly engaging said axleshaft.

18. The axle assembly of claim 15 further including a sensor insert fixed to said sensor, said sensor insert being coupled to said sensor mount via a threaded fastener, said sensor insert and said fastener being operable to restrict movement of said sensor relative to said sensor mount.

19. The axle assembly of claim 15 wherein said sensor is a Hall-effect sensor.

20. The axle assembly of claim 15 wherein said sensor mount includes sintered powdered metal.

21. The axle assembly of claim 15 wherein said first region of corrosion resistant material includes stainless steel.

22. The axle assembly of claim 15 wherein said second region includes a material having a maximum carbon content of 0.10 percent.

23. The axle assembly of claim 15 wherein said sensor mount is a one-piece structure having said first region of material positioned adjacent to and in contact with said second region of material.

24. A method of making an axle assembly, the method comprising:
- providing an axle housing with a tubular portion;
- sintering a non-corrosive powdered metal and a weldable powdered metal to form a sensor mount having a first region of non-corrosive metal and a second region of weldable metal;
- welding said second region to said tubular portion of said axle housing;
- forming a sensor aperture through said sensor mount and said tubular portion;
- inserting an axleshaft into said tubular portion, said axleshaft including a target portion that is aligned with said sensor aperture; and
- inserting a sensor within said sensor aperture to position an end of said sensor in proximity to said target portion of said axleshaft.

25. The method of claim 24 further including fixing a sensor insert to said sensor and coupling said sensor insert to said sensor mount with a threaded fastener to restrict movement of said sensor relative to said tubular portion.

26. The method of claim 24 wherein said sensor is a Hall-effect sensor.

27. The method of claim 26 wherein said target portion includes a plurality of circumferentially spaced apart teeth.

28. The method of claim 24 further including mounting a bearing in said tubular portion proximate said sensor hole and supporting a portion of said axleshaft with said bearing.

29. The method of claim 28 wherein prior to inserting said axleshaft, the method further comprises installing a shaft seal to said tubular portion.

30. The method of claim 29 wherein said bearing is disposed between said shaft seal and said sensor aperture.

31. The method of claim 24 further including positioning a seal between said sensor and said sensor mount and engaging said seal with said first region.

32. The method of claim 24 wherein said first region is positioned adjacent to and in contact with said second region.

* * * * *